United States Patent
Abu-Isa et al.

(10) Patent No.: US 6,706,793 B2
(45) Date of Patent: Mar. 16, 2004

(54) INTUMESCENT FIRE RETARDANT COMPOSITION AND METHOD OF MANUFACTURE THEREOF

(75) Inventors: Ismat A. Abu-Isa, Rochester Hills, MI (US); Richard W. Marczewski, Dryden, MI (US); Mark M. Williams, Rochester, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/251,566

(22) Filed: Sep. 20, 2002

(65) Prior Publication Data

US 2003/0158314 A1 Aug. 21, 2003

Related U.S. Application Data

(63) Continuation-in-part of application No. 10/055,112, filed on Jan. 23, 2002
(60) Provisional application No. 60/351,137, filed on Jan. 23, 2002.

(51) Int. Cl.[7] ................................................. C08K 3/04
(52) U.S. Cl. ........................ 524/409; 524/494; 524/495
(58) Field of Search ................................. 524/409, 494, 524/495

(56) References Cited

U.S. PATENT DOCUMENTS

| | | | |
|---|---|---|---|
| 4,101,510 A | 7/1978 | Spanswick | 260/45.75 B |
| 4,413,822 A | 11/1983 | Fernandez et al. | 273/73 C |
| 4,459,339 A | 7/1984 | Libit | 428/514 |
| 4,509,559 A | 4/1985 | Cheetham et al. | 138/121 |
| 4,588,523 A | 5/1986 | Tashlick et al. | 252/606 |
| 4,945,015 A | 7/1990 | Milner et al. | 523/179 |
| 5,232,737 A | 8/1993 | Ghorashi et al. | 427/120 |
| 5,286,775 A | 2/1994 | Bandyopadhyay | 524/416 |
| 5,346,763 A | 9/1994 | Balloni et al. | 428/349 |
| 5,352,430 A | 10/1994 | McCulfor et al. | 423/448 |
| 5,525,651 A * | 6/1996 | Ogoe et al. | 523/436 |
| 5,552,198 A | 9/1996 | Hiltner et al. | 428/35.7 |
| 5,618,881 A | 4/1997 | Hojabr | 525/64 |
| 5,780,129 A | 7/1998 | Ohta | 428/35.7 |
| 5,789,470 A | 8/1998 | Herbst et al. | 524/100 |
| 5,804,623 A | 9/1998 | Koffmann et al. | 524/101 |
| 5,834,535 A | 11/1998 | Abu-Isa et al. | 523/179 |
| 5,942,330 A | 8/1999 | Kelley | 428/423.1 |
| 6,043,306 A * | 3/2000 | Imahashi | 524/436 |
| 6,153,668 A | 11/2000 | Gestner et al. | 523/179 |
| 6,184,269 B1 | 2/2001 | Abu-Isa et al. | 523/179 |
| 6,238,594 B1 | 5/2001 | Turpin et al. | 252/389.2 |
| 6,410,137 B1 | 6/2002 | Bunyan | 428/356 |

FOREIGN PATENT DOCUMENTS

| | | |
|---|---|---|
| EP | 0761755 A1 | 12/1997 |
| EP | 0761755 B1 | 12/1997 |
| GB | 874762 | 10/1961 |
| WO | WO 99/38933 | 5/1999 |

OTHER PUBLICATIONS

"Tyrin Thermoplastic Resins, For Versatility, Function and Performance", DuPont Dow Elastomers, 1996, pp. 1–27.
"E151A, 44 mol% ETHYLENE*, High Barrier Resin for Multilayer Barrier Structures", EVAL RESIN, Ethylene Vinyl Alcohol Copolymer, pp. 1–3.
U.S. patent application Ser. No. 09/632,989, Abu–Isa, filed Aug. 4, 2000.
"Recycling of Crate Material: Weatherability of Stabilised Recycled High Density Polyethylene", P. Vink, et al., Polymer Degradation and Stability 9 (1984) 133–144.
"Thermo–Oxidative Degradation of Polyethylene. IV Blends Containing Poly(Vinyl Chloride) and Chlorinated Polyethylene as Models for Polyethylene Recycle Qualities", Holmstrom, et al., Polymer Engineering and Science, Sep., 1997, vol. 17, No. 9, pp. 700–705.
Grant and Hackh's Chemical Dictionary, pp. 33, 113, 114, 626 & 627, McGraw–Hill Book Company, Mar. 7, 1991.

* cited by examiner

*Primary Examiner*—Kriellion A. Sanders
(74) *Attorney, Agent, or Firm*—Jimmy L. Funke

(57) ABSTRACT

One embodiment of an intumescent composition comprises a halogenated polymer, antimony oxide, and intercalated graphite, while one embodiment of an intumescent additive mixture comprises antimony oxide and intercalated graphite.

One embodiment of the method of making an intumescent composition comprises melt blending a halogenated polymer with antimony oxide, and intercalated graphite.

23 Claims, 2 Drawing Sheets

INTUMESCENT FIRE RETARDANT COMPOSITION AND METHOD OF MANUFACTURE THEREOF

CROSS REFERENCE TO RELATED APPLICATIONS

This application is a Continuation-in-Part of U.S. Ser. No. 10/055,112, filed Jan. 23, 2002, and claims priority to U.S. Provisional Application No. 60/351,137 filed Jan. 23, 2002, the entire contents of which are incorporated herein by reference.

BACKGROUND

This disclosure relates to fire retardant materials, and, more particularly, to moldable intumescent compositions. Intumescent compositions are generally fire retardant composite compounds that swell and form ceramic-like sponges when exposed to the high temperatures. Intumescent compositions can be applied in the form of coatings or paints or they may be formed into mat-like structures that may be placed within or around an apparatus exposed to or operating under high temperatures.

Intumescent compositions are generally used on the wall surfaces of buildings, ships, aircraft, motor vehicles, or other vessel. The nature of the composition allows its thickness to be kept at a minimum until it is activated by high temperatures. The composition, upon being subjected to such activation temperatures (e.g., temperatures greater than 350° C.), gives off gases and at the same time undergoes molecular changes, which results in a foamed matrix and a change in physical properties such as the formation of incombustible or low combustible residues that have a reduced ability to conduct heat. In many instances, a major part of the residue formed is a carbonaceous material that is formed by decomposition of the matrix polymer or the dehydration of a polyhydric substance such as a polyalcohol incorporated into the composition for that purpose. Reactions occur within the intumescent composition so that when the composition is heated to beyond a specific activation temperature, components (such as the polyhydric alcohol, ammonium hydrogen phosphate or hydrated magnesia) within the composition are decomposed, thereby generating water, carbon dioxide, ammonia, and/or other heat absorbing gases that do not readily support combustion.

Intumescent compositions can be applied in the form of coatings or mat-like structures. Intumescent coatings however, require a lengthy and complicated process for their application to a surface. Oftentimes, a primer is required to promote adhesion to the surface, and a drying time of several hours may be needed. When these coatings become intumescent after exposure to elevated temperatures, the coatings are transformed into a weak sponge with a limited life.

Mat-like structures can be used in place of coatings to avoid some of the problems associated with the coatings. In the mat-like structures, multiple layers of fire resistant materials having intumescent materials located therebetween are used to provide a flexible wrap that provides stability to expanded intumescent materials. These flexible wraps generally include alternating layers of fire resistant materials and intumescent materials that are designed to expand to provide a consistent and effective fire protection system. Although mat-like structures can be manufactured to have sufficient flexibility that allows them to conform to the shape of the object to be protected (e.g., conduits, electrical cable, etc.), they tend to require additional hardware or an adhesive in order to be held into place. The additional hardware and the use of adhesives, adds to the complexity and costs associated with this use.

BRIEF SUMMARY

Disclosed herein is an intumescent composition, an intumescent additive mixture for forming the intumescent composition, methods for forming the intumescent composition, articles made from the intumescent composition, intumescent additive mixture, and reaction products of the intumescent composition and the intumescent additive mixture. In one embodiment, the intumescent composition comprises a halogenated polymer, antimony oxide, and intercalated graphite. In one embodiment of the intumescent additive mixture, the mixture comprises antimony oxide and intercalated graphite.

One embodiment of the method of making an intumescent composition comprises melt blending a halogenated polymer with antimony oxide, and intercalated graphite.

These and other features will become better understood from the detailed description that is described in conjunction with the accompanying drawings.

BRIEF DESCRIPTION OF THE DRAWINGS

The intumescent composition, intumescent additive mixture, and method for forming the intumescent composition will now be described by way of example, with reference to the accompanying Figures, which are meant to be exemplary and not limiting.

DETAILED DESCRIPTION OF PREFERRED EMBODIMENTS

Figure 1:
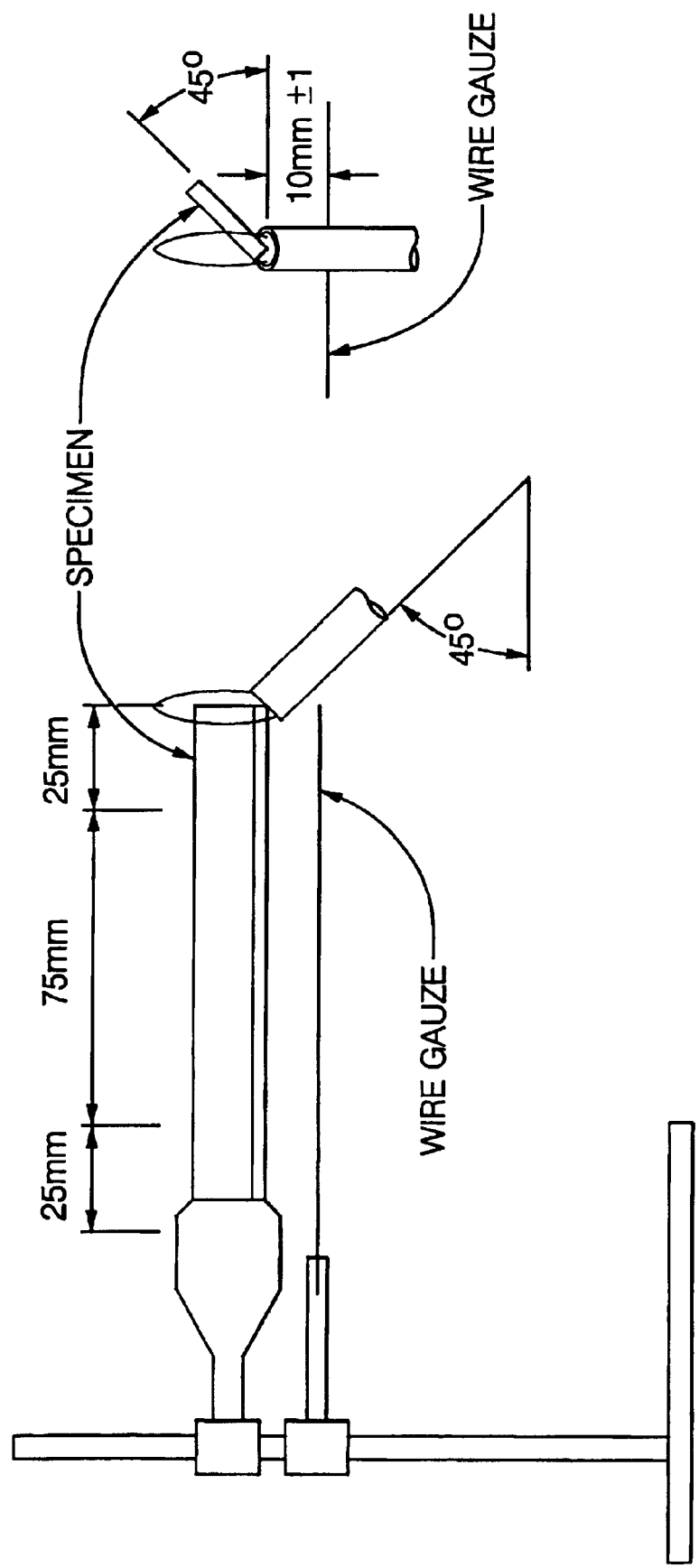
FIG. 1 is a perspective view of a horizontal burn test apparatus, described in Underwriters Laboratories 94HB, and used for measuring the burn rate of moldable intumescent composite materials.

This disclosure relates to an intumescent composition, an intumescent additive mixture for the intumescent composition, and method for manufacturing the intumescent composition, wherein the intumescent additive mixture may be added to a halogenated polymer to convert the halogenated polymer into an intumescent fire-retardant composition. It has been discovered that a synergistic intumescent effect exists between antimony oxide and intercalated graphite at elevated temperatures (hereinafter referred to as an activation temperature) such that the addition of an intumescent additive mixture consisting essentially of antimony oxide and intercalated graphite to the halogenated polymer renders the composition intumescent without the requirement of additional compounds. The activation temperature as defined herein is that temperature or temperatures wherein the components of the composition are activated to render composition intumescent. It is understood that different components of the intumescent composition may be activated at different temperatures when subjected to a source of heat. For example, upon exposure to a source of heat such as a flame, one of the components of the intumescent composition may decompose at a certain temperature to give off water, while at another temperature another component may give off carbon dioxide, or the like.

Various halogens can be employed in the halogenated polymer, such as bromine, chlorine, fluorine, iodine and the like, as well as combinations comprising at least one of the foregoing halogens. A preferred halogenated polymer is a chlorinated polyethylene. The chlorinated polyethylene preferably has a chlorine content of about 25 weight percent (wt %) to about 45 wt %, based upon the total weight of the chlorinated polyethylene. Within this range, a chlorine content of greater than or equal to about 32 wt % is preferred, with greater than or equal to about 36 wt % more preferred, based upon the total weight of the chlorinated polyethylene. The chlorinated polyethylene preferably has a chlorine content less than or equal to about 43 wt %, and more preferably less than or equal to about 42 wt % based upon the total weight of chlorinated polyethylene. The chlorinated polyethylene can be used to tailor the mechanical properties and improve flammability resistance in the composition, thus resulting in char formation after exposure to fire or elevated temperatures. The chlorinated polyethylene can also function as an impact modifier to increase the impact strength of the polymer composition, and to improve the noise damping and vibration isolation capabilities of the intumescent composition. Suitable, chlorinated polyethylenes are commercially available, from the DuPont Dow Elastomers Company, Midland, Mich.

Halogenated polymers are generally used in amounts of about 5 wt % to about 90 wt % based upon the total weight of the intumescent composition. Within this range, an amount of halogenated polymer of greater than or equal to about 30 wt % is preferred, with greater than or equal to about 35 wt % more preferred, based upon the total weight of the intumescent composition. Also preferred, within this range, are halogenated polymers in amounts of less than or equal to about 75 wt %, with less than or equal to about 70 wt % of the total weight of the intumescent composition more preferred.

Other polymeric resins may also be used in the intumescent compositions. The polymeric resin may be a thermoplastic resin, a thermosetting resin, and combinations comprising at least one of the foregoing resins. Specific, nonlimiting examples of suitable thermoplastic resins include polyolefins, polyamides, polysulfones, polyimides, polyamideimides, polyetherimides, polyether sulfones, polyphenylene sulfides, polyether ketones, polyether ether ketones, polystyrenes, polyacrylates, polyacrylonitrile, polyacetals, polycarbonates, polyphenylene ethers, polyvinylidene chloride, fluoropolymers, and combinations comprising at least one of the foregoing thermoplastic resins.

Specific, nonlimiting examples of thermosetting resins include polyurethane, natural rubber, synthetic rubber, epoxy, phenolic, polyamides, silicones, cyanate esters, vinylcyclobutene, benzocyclobutene, and combinations comprising at least one of the foregoing thermosetting resins. Blends of thermoplastic resins with thermosetting resins can also be utilized.

The polymeric resins are generally used in amounts of about 5 wt % to about 90 wt % based upon the total weight of the intumescent composition. Within this range, an amount of polymeric resin of greater than or equal to about 30 wt % is preferred, with greater than or equal to about 35 wt % more preferred, based upon the total weight of the intumescent composition. Also preferred, within this range, are resins in amounts of less than or equal to about 75 wt %, with less than or equal to about 70 wt % of the total weight of the intumescent composition more preferred.

The antimony oxide used in the intumescent composition preferably has a purity greater than or equal to about 98 wt %, more preferably greater than or equal to about 98.5 wt %, and even more preferably greater than or equal to about 99 wt % based upon the total weight of the antimony oxide. Antimony oxide is preferably present in the intumescent composition in an amount of about 1 wt % to about 60 wt % based upon the total weight of the intumescent composition. Within this range, an amount of antimony oxide of greater than or equal to about 2 wt % is preferred, with greater than or equal to about 3 wt % based on the total weight of the total intumescent composition more preferred. Further, within this range, the antimony oxide is preferably present in an amount of less than or equal to about 35 wt %, and more preferably less than or equal to about 15 wt % based on the total weight of the intumescent composition. Suitable grades of antimony oxide are commercially available from Occidental Chemical Corporation (Oxychem), Dallas, Tex., under the trademarks FIRESHIELD H®, FIRESHIELD L®, ULTRAFINE II®, THERMOGUARD S®, and THERMOGUARD L®.

As stated above, the intumescent composition also comprises an intercalated graphite. The term "intercalated graphite" as used herein represents graphite, which has been intercalated in the presence of, for example, an oxidizing agent as further described below. In the method of making intercalated graphite, natural graphite flakes are intercalated by dispersing the flakes in a solution containing an oxidizing agent. Suitable oxidizing agents include but are not limited to nitric acid, potassium chlorate, chromic acid, potassium permanganate, potassium chromate, potassium dichromate, perchloric acid, and the like, and combinations comprising at least one of the foregoing oxidizing agents. A preferred intercalating solution is one wherein an oxidizing agent, e.g., nitric acid, perchloric acid, chromic acid, potassium permanganate, hydrogen peroxide, iodic or periodic acids, is dissolved in either a sulfuric acid, or a solution of sulfuric acid with phosphoric acid. Although less preferred, the intercalation solution may also contain metal halides such as ferric chlorides, bromides, iodides, fluorides, and the like. Other suitable intercalants for graphite are water, potassium, rubidium, cesium, lithium, bromine and the like. After the flakes are intercalated with the intercalating solution, excess solution is drained from the flakes. The wet flakes are then washed with water and dried. The thus treated flakes of graphite are referred to as "intercalated graphite".

The intercalated graphite is generally present in an amount of about 1 wt % to about 60 wt % based on the total weight of the intumescent composition. Within this range, the intercalated graphite may be used in an amount preferably greater than or equal to about 2 wt %, and more preferably greater than or equal to about 3 wt % based on the total weight of the intumescent composition. Also preferred within this range, is an amount of less than or equal to about 35 wt %, and more preferably less than or equal to about 25 wt % based on the total weight of the intumescent composition. The preferred intercalated graphite is intercalated with sulfuric acid, for example DXN 3579 commercially available from Asbury Graphite Mills Inc; Asbury, N.J.

In addition to the intercalated graphite, other types of graphite may be optionally added to the intumescent composition such as, for example, unexfoliated graphite, flexible graphite, graphitic vapor grown carbon fibers, partially graphitic vapor grown carbon fibers, carbon nanotubes, and the like, and combinations comprising at least one of the foregoing graphites. The term "unexfoliated graphite" as used herein represents natural or synthetic graphite, which may be crystalline or amorphous. The term "flexible graphite" as used herein represents the exfoliated reaction product of rapidly heated natural graphite particles that have been treated with an agent that intercalates into the crystal-structure of the graphite to expand the intercalated particles at least 80 or more times in the direction perpendicular to the carbon layers in the crystal structure. Upon exposure to activation temperatures either as part of the intumescent composition or in an independent process, the flakes of intercalated graphite expand in dimension by as much as about 80 to about 1,000 times the original volume in an accordion-like fashion, i.e., in the direction perpendicular to the crystalline planes of the constituent graphite particles. These expanded flakes of graphite as defined above, are also known as exfoliated graphite or flexible graphite and are vermiform (wormlike) in appearance.

In one embodiment the intumescent compositions may comprise flexible graphite, which has been independently exfoliated along with intercalated graphite. When combinations of intercalated graphite and flexible graphite are used in intumescent compositions the intercalated graphite is preferably used in an amount of greater than about 15 wt %, preferably greater than about 25 wt %, preferably greater than about 30 wt % of the weight of the mixture of intercalated and flexible graphite.

Graphitized or partially graphitized vapor grown carbon fibers having diameters of about 3 to about 1,000 nanometers (nm) may optionally also be used in the intumescent compositions. Vapor grown carbon fibers are generally cylindrical, and have a hollow core.

Graphitic or partially graphitic vapor grown carbon fibers are generally produced by the decomposition of a hydrocarbon gas (e.g., propane, methane, and acetylene) in the presence of transition metal catalysts (e.g., nickel, iron, and cobalt) at temperatures of about 450° C. to about 1,800° C. The vapor grown carbon fibers thus obtained may have graphitic layers arranged in a "tree-ring" or "fish-bone" fashion and possess aspect ratios from about 5 to about 10,000. The diameter of the vapor grown carbon fibers is preferably about 3 nanometers (run) to about 1000 nm. These vapor grown carbon fibers are generally produced in the form of clusters called agglomerates. An agglomerate may be comprised of a single cluster or a group of clusters. A quantity of pyrolytically deposited carbon or amorphous carbon may also be present on the exterior of the vapor grown carbon fibers which causes the fibers to be termed "partially graphitic".

Carbon nanotubes can be produced by laser-evaporation of graphite or by carbon arc synthesis and may consist of a single-wall having an outer diameter of about 0.7 nm to about 3 nm or have multiple concentrically arranged walls (multi-wall) with outer diameters of about 2 to about 50 nm. The single-wall or multi-wall nanotubes may have aspect ratios of about 5 to about 10,000. Single-wall carbon nanotubes may also be obtained by separating the various carbon layers forming the "tree ring" in a multi-wall nanotube and it is contemplated that these single-wall nanotubes having diameters of about 0.7 nm to about 1,000 nm may also be incorporated into the intumescent composition. Single-wall carbon nanotubes may also be used in the intumescent composition with other additives such as, for example, antimony oxide, hindered phenols, chlorinated polyethylene, distearylthiodipropionate, magnesium hydroxide, chlorinated wax, ammonium dihydrogen orthophosphate, and combinations comprising at least one of the foregoing intumescent additives.

When combinations of intercalated graphite and vapor grown carbon fibers or carbon nanotubes are used in intumescent compositions the intercalated graphite is preferably used in an amount of greater than about 15 wt %, preferably greater than about 25 wt %, preferably greater than about 30 wt %, based on the total weight of the vapor grown carbon fibers or carbon nanotubes or both and the intercalated graphite.

Various plasticizers may be optionally added to the intumescent composition in order to improve the low temperature mechanical properties (e.g., impact, ductility) and processability of the intumescent composite. The plasticizer is preferably a chlorinated wax (chlorowax) compound or a silicone rubber (e.g., silphenylene siloxane elastomer) or commercially available free flowing silicone powder, which consists of polydiorganosiloxane rubber blended with finely divided filler such as fumed silica, e.g., such as DOW SILICONE 4-7081® commercially available from Dow Corning, Midland, Mich.). Other plasticizers include organic phosphates and organic esters. The plasticizers are optional, and if present, are utilized in an amount of about 3 wt % to about 25 wt % based on the total weight of the intumescent composition. Within this range, the plasticizer may be present in an amount preferably greater than or equal to about 5 wt % based on the total weight of the intumescent composition. Further within this range the plasticizer may be used in an amount of less than or equal to about 22 wt %, and preferably less than or equal to about 20 wt % based on the total weight of the intumescent composition. In a preferred embodiment, the plasticizer, is a chlorowax commercially available under the trademark PAROIL 145® from the Dover Corporation, Canada.

Foaming agents may optionally be incorporated to foam the intumescent composition after it is exposed to the activation temperatures of a heat source. For example, during a fire, elevated temperatures above the glass transition temperature can cause the polymeric resin matrix to soften, and at the same time or shortly thereafter cause the evolution of gases from the foaming agent. As the gases expand and diffuse through the softened matrix they form gas pockets, which make the intumescent composite porous thereby improving its thermal insulation characteristics. Suitable foaming agents can include ammonium dihydrogen-ortho-phosphate ($NH_4H_2PO_4$), ammonium polyphosphate (($NH_4PO_3)_x$), hydrated metal oxides and hydroxides such as hydrated magnesium oxide, magnesium hydroxide, hydrated aluminum oxide, metal carbonates and bicarbonates, and the like, as well as combinations comprising at least one of the foregoing compounds. Hydrated alumina and hydrated magnesia emit their water of hydration as water vapor, which has a tendency to reduce the temperature of the fire. Magnesia also has a tendency to absorb hydrochloric acid gas that is produced and evolved during the aging or high temperature decomposition of the chlorinated polyethylene, and further has the ability to act as a dehydrochlorination stabilizer.

The foaming agent, if present, is utilized in the intumescent composition in an amount of about 3 wt % to about 40 wt % based on the total weight of the intumescent composition. Within this range, the foaming agent may be used in an amount greater than or equal to about 5 wt % based on the total weight of the intumescent composition. Within this range, it is desirable to use the foaming agent in an amount of less than or equal to about 38 wt %, and preferably less than or equal to about 35 wt % based on the total weight of the intumescent composition. In a preferred embodiment magnesium hydroxide may be used as the foaming agent in the intumescent composition. The hydrated alumina is commercially available as MARTINAL OL-104C® from Lonza, Inc., Fair Lawn, N.J., while magnesia is commercially available as MAGSHIELD 98® from Martin Marietta, Baltimore, Md., among other sources.

The intumescent composition may also optionally comprise an antioxidant such as a sulfur-based distearylthiodipropionate and a hindered phenol. The antioxidants may be present in the intumescent composition in an amount of about 1 wt % to about 10 wt % based on the total weight of the intumescent composition. Within this range, the antioxidant may preferably be used in an amount of greater than or equal to about 2 wt %, more preferably greater than or equal to about 3 wt % based on the total weight of the intumescent composition. Within this range, it is generally desirable to have the antioxidants present in an amount of less than or equal to about 9 wt %, preferably less than or equal to about 8 wt % based on the total weight of the intumescent composition. Distearylthiodipropionate is commercially available as DSDTP® from Witco Corporation, Greenwich, Conn., and the phenol is available as WINGSTAY L® from R. T. Vanderbilt, Norwalk, Conn. Other antioxidants based on hindered phenols, such as, for example, IRGANOX 1010® from Ciba Geigy, or sulfur compounds, such as VANAX A® from R. T. Vanderbilt, or amine containing compounds, such as AGERITE WHITE® from R. T. Vanderbilt, are also effective thermal and oxidation stabilizers for use in the intumescent composition.

A char-forming compound may further be optionally added to the intumescent composition to form a char when the intumescent composition is exposed to fire. Char is a black residue formed as a result of the burning of an organic material. Once formed, char becomes chemically stable and functions as a thermal barrier by inhibiting further combustion. The char-forming compound may be a carbohydrate, polyhydric alcohol (such as pentaerythritols, and the like), starch or sugar derivatives, as well as combinations comprising at least one of the foregoing materials. A preferred char forming compound is a blend of monopentaerythritol and dipentaerythritol, which are commercially available for example, as PERSTORP PE® from Perstorp Polyols, Inc., Toledo, Ohio.

The intumescent composition can also optionally comprise additives aimed at reducing smoke when the intumescent composition burns, for example, metal oxides such as titanium dioxide, and cobalt and manganese organic compounds. In addition to reducing smoke, these smoke reducing additives also improve the processability of the intumescent composition during formation by reducing the torque required for melt processing. Moreover, the aesthetic qualities of articles molded from the intumescent composition are enhanced. These smoke reducing additives also provide added flame retardancy to the formulation and serve to further enhance the formation of char.

The intumescent composition may optionally contain crosslinking agents. Generally, these cross-linking agents are small concentrations of free radical-generating peroxides, such as dicumyl peroxide, and crosslinking co-agents, such as trimethylolpropane trimethacrylate (TMPT), and the like, as well as combinations comprising at least one of the foregoing cross-linking agents and coagents. These agents improve the rigidity of the intumescent composite material, especially upon exposure to fire. Dicumyl peroxide is commercially available for example, under the trademark DICUP 40KE® from Hercules Inc., Wilmington, Del., and TMPT is available as a liquid or adsorbed to the surface of silica powder SARET 500® from Sartomer Company, Inc., Exton, Pa.

Fibrous fillers may also be optionally used in the intumescent compositions. The fibrous fillers generally provide reinforcement for the intumescent compositions into which they are introduced. When present, the fibrous filler preferably has an aspect ratio greater than 1. Non-limiting examples of suitable fibrous fillers include short inorganic fibers such as those derived from aluminum silicates, aluminum oxides, magnesium oxides, calcium sulfate hemihydrate, boron, ceramics such as silicon carbide, mixed oxides of aluminum, boron and silicon such as those commercially sold under the trade name NEXTEL® by 3M Co., St. Paul, Minn., USA and combinations comprising at least one of the foregoing fibrous fillers. Also included among fibrous fillers are single crystal fibers or "whiskers" including silicon carbide, boron carbide, iron, nickel, copper and combinations comprising at least one of the foregoing whiskers.

In addition, synthetic reinforcing fibers derived from polyarylates, polyethylene, polyvinylalcohol, polytetrafluoroethylene, acrylic resins may be used. Aromatic polyamides, polyaramid fibers such as those commercially available from Du Pont under the trade name KEVLAR®, polybenzimidazole, polyimide fibers such as those available from Dow Chemical Co. under the trade names POLYIMIDE 2080® and PBZ® fiber, polyphenylene sulfide, polyether ether ketone, polybenzoxazole, polyetherimides, and the like, as well as combinations comprising at least one of the foregoing synthetic reinforcing fibers may also be used.

The synthetic reinforcing fillers may be provided in the form of monofilament or multifilament fibers and can be used either alone or in combination with other types of fibers, through, for example, co-weaving, core/sheath or side-by-side, constructions, and the like, or by other methods known to one skilled in the art of fiber manufacture. Typical co-woven structures include glass fiber-carbon fiber weaves, carbon fiber-aromatic polyimide (aramid) fiber weaves, and aromatic polyimide fiber-glass fiber weaves. Synthetic reinforcing fillers may be supplied in the form of, for example, rovings, woven fibrous reinforcements, such as 0–90 degree fabrics, non-woven fibrous reinforcements such as continuous strand mat, chopped strand mat, tissues, papers and felts and 3-dimensionally woven reinforcements, preforms and braids.

In a preferred embodiment, glass fibers are used as the fibrous fillers in the intumescent compositions. Useful glass fibers include those prepared from fiberizable glass compositions commonly known as "E-glass," "A-glass," "C-glass," "D-glass," "R-glass," "S-glass," as well as E-glass derivatives that are fluorine-free and/or boron-free. Most reinforcement mats comprise glass fibers formed from E-glass and are included for use in the intumescent composition.

Commercially produced glass fibers generally having nominal filament diameters of about 1.0 to about 35.0 micrometers ($\mu$m), and most commonly produced E-glass fibers having nominal filament diameters of about 9.0 to about 30.0 $\mu$m may be included in the intumescent compositions. The filaments are made by standard processes e.g., by steam or air blowing, flame blowing, and mechanical pulling. The preferred filaments for plastics reinforcement are made by mechanical pulling. Use of non-round fiber cross sections are also possible. The glass fibers may be sized or unsized. Sized glass fibers are coated on at least a portion of their surfaces with a sizing composition selected for compatibility with the halogenated polymer or the polymeric resin of the intumescent composition. The sizing composition facilitates wet-out and wet-through of the matrix material upon the fiber strands and assists in attaining desired physical properties in the composite.

The glass fibers are preferably glass strands that have been sized. In preparing the glass fibers, a number of filaments can be formed simultaneously, sized with the coating agent and then bundled into a strand. Alternatively the strand itself may be first formed of filaments and then sized. The amount of sizing employed is generally that amount which is sufficient to bind the glass filaments into a continuous strand and is present in an amount of about 0.1 wt % to about 5 wt % based on the total weight of the glass fibers. The glass fiber may comprise any length depending upon the intended application.

When present, the fibrous fillers are used in the intumescent composition in an amount of about 1 wt % to about 20 wt % based on the total weight of the intumescent composition. Within this range, the fibrous fillers are preferably present in an amount of greater than or equal to about 2 wt % based on the total weight of the intumescent composition. Further, within this range, the fibrous filler is present in the intumescent composition in an amount of preferably less than or equal to about 17 wt %, and more preferably less than or equal to about 15 wt % based on the total weight of the intumescent composition.

In appropriate formulations, a non-fibrous filler material consisting of glass, mica, carbon (such as carbon black and the like), titanium oxide, clay, calcium carbonate, and the like, as well as combinations comprising at least one of the foregoing fillers, in the form of particles, powder, spheres, nanospheres, and the like, as well as combinations comprising at least one of the foregoing non-fibrous fillers can be optionally added to the intumescent composition. These non-fibrous filler materials help strengthen the intumescent composition material during processing and allow the molded composition to develop a higher modulus after molding.

In one embodiment, the antimony oxide and intercalated graphite may be used as an intumescent additive mixture to form the intumescent composition. In this embodiment, the intumescent additive mixture consists essentially of about 35 wt % to about 65 wt % antimony oxide and about 35 wt % to about 65 wt % intercalated graphite, based on the total weight of the intumescent additive mixture. Within the range specified, the antimony oxide may be present in an amount of greater than or equal to about 40 wt %, preferably greater than or equal to about 45 wt % based on the total weight of the intumescent additive mixture. Further, within this range it is desirable for the antimony oxide to be present in an amount of less than or equal to about 60 wt %, preferably less than or equal to about 55 wt % based on the total weight of the intumescent additive mixture. Similarly, within the range specified for the intercalated graphite, it may be present in an amount of greater than or equal to about 40 wt %, preferably greater than or equal to about 45 wt % based on the total weight of the intumescent additive mixture. Further, within this range it is desirable for the intercalated graphite to be present in an amount of less than or equal to about 60 wt %, preferably less than or equal to about 55 wt % based on the total weight of the intumescent additive mixture.

The intumescent additive mixture may be added to the polymeric resins described above in a melt blending operation to form either an intermediate or a final intumescent composition as desired. Typical melt blending operations are those, which may be conducted in a single or twin screw extruder, buss kneader, roll mills, and the like. Other optional additives listed above may also be added during the melt blending operation. The intermediate or final intumescent composition may also be manufactured from the intumescent additive mixture in multiple steps on different pieces of equipment. The antimony oxide, intercalated graphite, chlorowax and other additives may be added simultaneously or sequentially to the melt blending equipment during the processing to form the intermediate or final intumescent composition. An intermediate intumescent composition may be formed into pellets, strands, briquettes, rods, sheets, slabs, and the like, for further downstream processing or added to additional polymeric resin to form the final intumescent composition.

The following examples, which are meant to be exemplary, not limiting, illustrate compositions and methods of manufacturing some of the various embodiments of the intumescent additive mixture using various materials and apparatus.

EXAMPLE 1

An intermediate intumescent composition comprising the ingredients shown in Table 1 is formed by feeding the ingredients with the exception of the glass fiber into the main feeder (hopper) of a 100 mm diameter Buss kneader.

TABLE 1

| Component | Weight Percent (wt %) |
| --- | --- |
| Chlorinated polyethylene (CPE 3615) | 38 |
| Chlorowax (PAROIL 145) | 8 |
| Magnesium Hydroxide (MAGSHIELD 98) | 25 |
| Distearylthiodipropionate (DSTDP) | 1 |
| Hindered Phenol Antioxidant | 1 |
| Glass Fiber | 9 |
| Antimony Oxide (FIRESHIELD) | 9 |
| Graphite (DXN 3579) | 9 |

The glass fiber was then fed into a port close to the exit of the Buss kneader. A 75 mm extruder arranged in a crosshead configuration with the exit of the Buss kneader was used as a melt pump to generate enough pressure for extrusion and pelletizing of the strands. The mixing in the Buss kneader and the crosshead extruder was conducted at about 140° C. to about 180° C. and at a screw speed of about 135 rpm to about 140 rpm. The thirty-seven strands emanating from the Buss kneader/crosshead extruder were pelletized at the extruder die by rotating knifes. Pellets were dropped into water for cooling. Pellets were subsequently dried by hot air blowing on a fluidized bed.

The intermediate intumescent composition of Table 1 was then incorporated at different levels to high-density polyethylene (HDPE) to form the final intumescent composition as shown in Table 2 by dry blending and by metering into the hopper during injection molding. Flame spread for each composition was measured as shown in Table 2 using Underwriters Laboratory (UL) horizontal burn test procedure UL 94HB as shown in FIG. 1. In this test a flame is applied to a horizontally oriented bar for a period of 30 seconds. If the sample extinguishes itself immediately after the flame is removed it is designated as SE-0. If the sample continues to burn after the removal of the flame but self-extinguishes before the flame front reaches the 25 mm (millimeter) mark, measured from the end of sample, then the sample is designated as SE. If the sample continues to burn beyond the 25 mm mark then a burn rate is established. The burn rate is defined as the distance the flame travels beyond the 25 mm mark divided by the burn time measured after the flame crosses the 25 mm mark. Fire is allowed to travel to within 25 mm of the other end of the sample. A material is classified as 94HB if burning rate does not exceed 40 mm/minute for samples 3 mm to 13 mm thick, or less than 75 mm/minute for samples less than 3 mm thick. Using this definition all samples shown in Table 2, are classified as 94HB. The sample thickness in all cases was 3 mm.

TABLE 2

| % Concentrate in HDPE | Flame Spread (mm/minute) |
|---|---|
| 0 | 25 |
| 20 | 19 |
| 40 | 7 |
| 45 | 0 |

The main function of the intumescent composition is to shield articles protected by the intumescent composition from elevated temperatures. The characteristics of intumescence efficiency are measured by a procedure using an intumescent flammability test apparatus, shown generally at 10 in FIG. 2.

Figure 2:
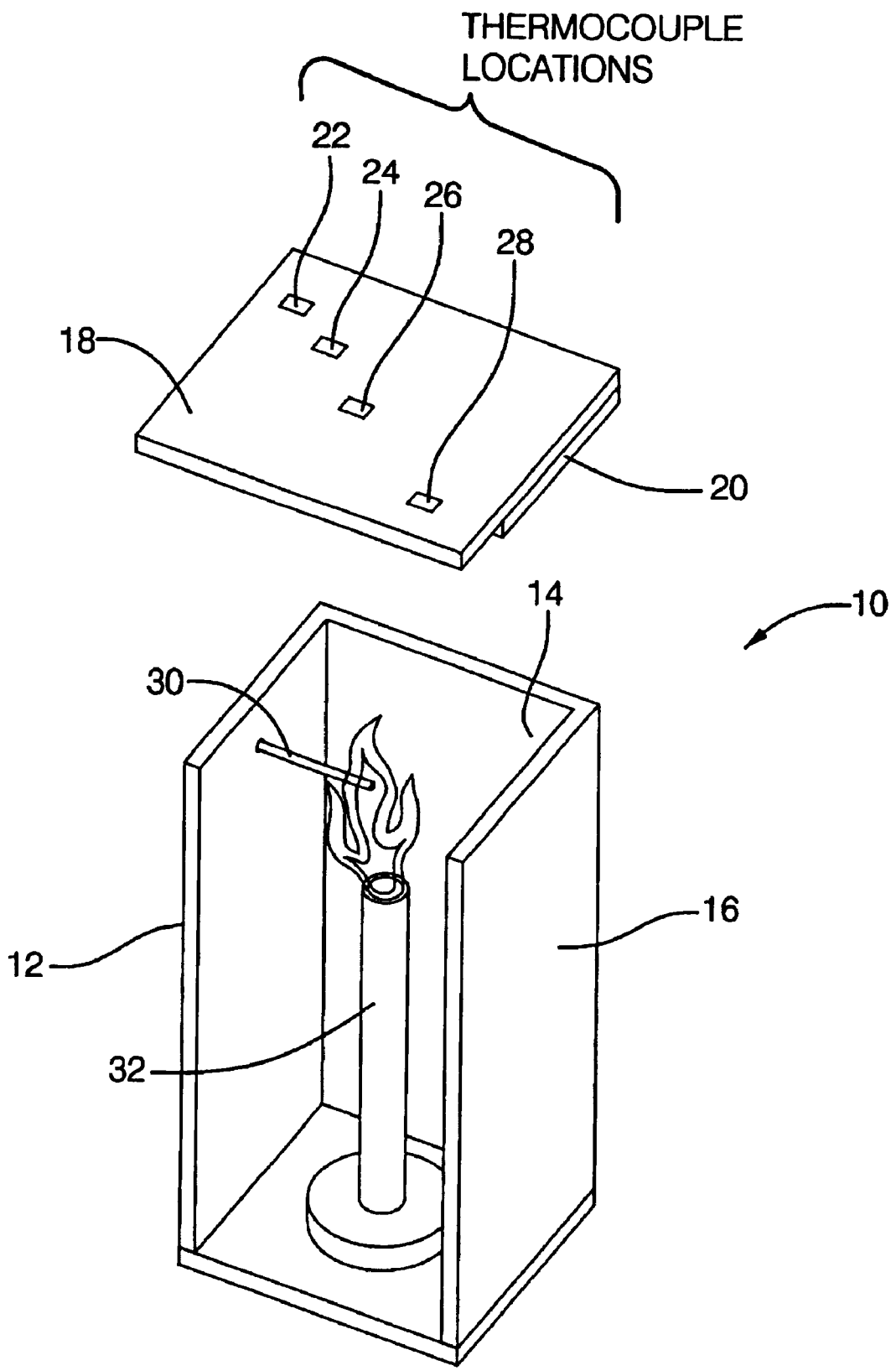
FIG. 2 is a perspective view of an intumescent flammability test apparatus used for measuring the efficiency of moldable intumescent composite materials.

Referring now to FIG. 2, the intumescent flammability test apparatus 10 is a three-walled chamber comprising a left side wall 12, a back wall 14, and a right side wall 16. Each wall 12, 14, or 16 is a steel plate 229 millimeters (mm) high, 127 mm wide, and 1 mm thick. A steel plate 152 mm square and 1 mm thick is used as a roof 18. The moldable intumescent composite material, shown generally at 20, is affixed to the under-side of roof 18, while four thermocouples are welded on the top side of roof 18 at locations 22, 24, 26, 28 to monitor temperatures at the various locations during the flammability test. A Bunsen burner 32 is utilized to provide a flame source and is disposed in the chamber. Flame temperatures are measured using a flame thermocouple 30 inserted through side wall 12 and into the blue flame region of the Bunsen burner 32. In this apparatus 10, the Bunsen burner 32 is 165 mm tall, and the flame height above the top of Bunsen burner 32 is 60 mm and is adjusted so that the tip of the inner blue cone of the flame touches the surface of intumescent composite material 20. Burning tests are carried out for 30 minutes. Differences between the flame thermocouple 30 and the roof top thermocouples 22, 24, 26 and 28 are used as a measure of the effectiveness of intumescent compositions in providing thermal and fire shielding. A final intumescent composition containing 45 wt % concentration of the intermediate composition, as shown in Table 2, in a blend with HDPE is a fire shield that can be used to contain fires and prevent other flammable materials from getting involved in the fire.

EXAMPLES 2–3

In these examples, the compositions of which are shown in Table 3, the synergistic effect of antimony oxide and intercalated graphite is demonstrated. In Example 2, the polymeric resin comprises HDPE, whereas in Example 3, the polymeric resin is a blend of HDPE and polypropylene. The HDPE utilized in Examples 2 and 3 is WR 201, a high viscosity polyethylene obtained from Atofina, Paris, France. The intumescent compositions were tested in accordance with Underwriters Laboratory vertical flammability test UL-94. The rating was V-0 for both Examples 2 and 3, indicating that the sample self-extinguished after removal of the flame. Moreover no after glow, and no melt dripping was observed.

In this tests a vertically oriented bar (125 mm long, 13 mm wide, and 3 mm thick) was exposed to a Bunsen burner flame for ten seconds. If the sample self extinguished, burn time (t1) was noted. The sample was then exposed to the flame for an additional 10 second period. If it again self-extinguished, burn time (t2) was noted. Five samples were tested. A sample was classified as V-0 if t1 and t2 were less than 10 seconds each, and no flaming melt dripping occurred.

TABLE 3

| Components | Example 2 (wt %) | Example 3 (wt %) |
|---|---|---|
| Chlorinated Polyethylene (CPE 3615) | 19 | 19 |
| HDPE (WR 201) | 50 | 25 |
| Polypropylene | — | 20 |
| Chlorowax (PAROIL 145) | 5 | 5 |
| Magnesium hydroxide (MAGSHIELD) | 10 | 15 |
| Distearylthiodipropionate (DSTDP) | 0.5 | 0.5 |
| Hindered phenol (WINGSTAY L) | 0.5 | 0.5 |
| Antimony Oxide (FIRESHIELD) | 10 | 5 |
| Graphite Flake (DXN 3579) | 5 | 10 |
| Properties | | |
| UL-94 Classification | V-0 (0 sec) | V-0 (0 sec) |
| SE-0 | Yes | Yes |
| Tensile Modulus @ 50% strain (MPa) | 9.5 | NA |
| Tensile strength (MPa) | 11.4 | 9.5 |
| Strain at Break (%) | 73.146 | 5.108 |
| Flexural Modulus (MPa) | 800 | 809 |

EXAMPLES 4–7

In these examples shown in Table 4, the melt viscosity of the polymer, e.g., polyethylene, utilized in the intumescent compositions was varied. The melt viscosity of a polymeric resin is measured by using the melt index, which is the number of grams of molten polymer that passes through a capillary when the polymer is heated to a certain temperature above its melting point and a load is applied to the polymer to push it through a capillary. Generally, for viscous polymers a load of 21,600 grams is needed in order to push the molten polymer through the capillary, while for lower viscosity polymers a load of 2,160 grams is used. In Example 4, a blow molding grade of polyethylene, WR 201 B, made by Atofina, having a melt index of 8 (at a load of 21,600 grams) was utilized. In Example 5, the polyethylene utilized was K-44-24-122, a medium melt viscosity polymer supplied by Solvay, Houston, Tex. The K-44-24-122 had a melt index of 0.35 g/10 minutes measured at 190° C. and a 2,160 gram load. In Examples 6 and 7, the polyethylene used was low viscosity T-50-2000 and T-50-4000 manufactured by Solvay and having melt indices of 20 and 45 grams/10 minutes when measured at 190° C. and a load of 2,160 grams, respectively. The results shown in Table 4 indicate that in all examples, the flammability was rated at V-0. However, while the intumescent compositions of Examples 4 and 5 (made of the more highly viscous polymer matrices) passed the stringent fire shielding flammability test, the intumescent compositions of Examples 6 and 7 (based on the less viscous injection molding grades) did not pass this stringent test even thought they have a V-0 rating.

TABLE 4

| Components | Example 4 | Example 5 | Example 6 | Example 7 |
|---|---|---|---|---|
| Chlorinated Polyethylene (CPE 3615) | 19 | 19 | 19 | 19 |
| HDPE (WR 201 B) | 45 | | | |
| HDPE (K44-24-122) | | 45 | | |
| HDPE (T-50-2000) | | | 45 | |
| HDPE (T-50-4400) | | | | 45 |
| Chlorowax (PAROIL 145) | 5 | 5 | 5 | 5 |
| Magnesium hydroxide (MAGSHIELD) | 15 | 15 | 15 | 15 |
| Distearylthiodipropionate (DSTDP) | 0.5 | 0.5 | 0.5 | 0.5 |
| Hindered phenol (WINGSTAY L) | 0.5 | 0.5 | 0.5 | 0.5 |
| Antimony Oxide (FIRESHIELD) | 5 | 5 | 5 | 5 |
| Graphite Flake (DXN 3579) | 5 | 5 | 5 | 5 |
| Glass fiber | 5 | 5 | 5 | 5 |
| Properties | | | | |
| UL-94 Classification | 94V-0 | 94V-0 | 94V-0 | 94V-0 |
| Fire Shield Flammability Test | Passed | Passed | Failed | Failed |
| Tensile Modulus @ 50% strain (MPa) | 10.2 | 7.4 | | |
| Tensile strength (MPa) | 11.9 | 7.9 | | |
| Strain at Break (%) | 601 | 478 | | |
| Flexural Modulus (MPa) | 511 | 715 | 1088 | 742 |

EXAMPLE 8

In this example, polypropylene obtained from Exxon Chemical Company, Houston, Tex. was employed in the intumescent composition. The polypropylene had a melt index of 3.1 grams/10 minutes at 230° C. and a load of 2,160 grams. The composition and the properties of Example 8 are shown in Table 5, where it can be seen that the material has a UL-94 rating of V-0 and passes the fire shield flammability test.

TABLE 5

| Components | Example 8 (wt %) |
|---|---|
| Chlorinated Polyethylene (CPE 3615) | 19 |
| Polypropylene | 45 |
| Chlorowax (PAROIL 145) | 5 |
| Magnesium hydroxide (MAGSHIELD) | 15 |
| Distearylthiodipropionate (DSTDP) | 0.5 |
| Hindered phenol (WINGSTAY L) | 0.5 |
| Antimony Oxide (FIRESHIELD) | 5 |
| Graphite Flake (DXN 3579) | 5 |
| Glass fiber | 5 |
| Properties | |
| UL-94 Classification | 94V-0 (1 sec) |
| Fire shield flammability test | Passed |
| Tensile Modulus @ 50% strain (MPa) | 14.14 |
| Tensile strength (MPa) | 15.65 |
| Strain at Break (%) | 51.6 |
| Flexural Modulus (MPa) | 1177 |

EXAMPLE 9–10

These examples, shown in Table 6, demonstrate the intumescent effect of compositions containing antimony oxide and the intercalated graphite. Example 9, which contained HDPE (K44-24-122) obtained from Solvay, showed that when intercalated graphite was eliminated from the formulation but the amount of antimony oxide was doubled, the material lost its effective fire shielding activity. Example 10 employed polypropylene and polyethylene as the base resin and contained a relatively high concentration of intercalated graphite but no antimony oxide. The formulation failed the fire shield flammability test as shown in Table 6. Thus, it can be seen that antimony oxide and intercalated graphite are synergistic in their activity as fire retardants and are effective when used together.

TABLE 6

| Components | Example 9 (wt %) | Example 10 (wt %) |
|---|---|---|
| Chlorinated Polyethylene | 19 | 19 |
| HDPE (K44-24-122) | 45 | — |
| HDPE (WR 201) | — | 25 |
| Polypropylene | — | 20 |
| Chlorowax (PAROIL 145) | 5 | 5 |
| Magnesium hydroxide (MAGSHIELD) | 15 | 15 |
| Distearylthiodipropionate (DSTDP) | 0.5 | 0.5 |
| Hindered phenol (WINGSTAY L) | 0.5 | 0.5 |
| Antimony Oxide (FIRESHIELD) | 10 | — |
| Graphite Flake (DXN 3579) | — | 15 |
| Glass fiber (3/16") | 5 | — |
| Properties | | |
| Fire Shield Flammability Test | Failed | failed |
| Tensile Modulus @ 50% strain (MPa) | 9.0 | — |
| Tensile strength (MPa) | 11.0 | 9.5 |
| Strain at Break (%) | 676 | 5.4 |
| Flexural Modulus (MPa) | 707 | 2,748 |

The addition of the intumescent additive mixture comprising antimony oxide and the intercalated graphite to the intumescent composition offers numerous advantages over other flame-retardants. The intumescent additive mixture can be added to other commonly available thermoplastic elastomers such as polyethylene, polypropylene, nylon, polyurethanes, and the like. Moreover, the synergistic effect between antimony oxide and intercalated graphite permits lower amounts of the intumescent additive mixture to be used in the intumescent compositions, leading to higher polymeric resin content when compared with intumescent compositions containing other flame retardants. The higher polymeric resin content provides a composition that retains the inherent and desirable properties of the neat polymeric resin. The intumescent compositions can also withstand higher temperatures than compositions containing more traditional flame-retardants. Some of the more commonly and commercially available flame-retardants are water soluble, which restricts their utility in certain applications. This problem can be avoided with the use of antimony oxide and intercalated graphite. The antimony oxide and intercalated graphite are low in cost and since a smaller amount of either can be added to achieve the effective flame retardancy, a further cost savings can be realized.

The intumescent additive mixture comprising antimony oxide and intercalated graphite can also be used in low as well as high melt viscosity polymers to obtain intumescent compositions. The use of the intumescent additive mixture offers numerous advantages over other methods of making intumescent compositions. For example, it is easier to mix the intumescent additive mixture into engineering and commodity thermoplastic resins such as polyethylene, polypropylene, polycarbonate, and the like. It is also easier to mix the intumescent additive mixture with traditional fire retardants, normally available in powder or liquid form. In addition, the intumescent additive mixture is less expensive than most commonly available flame retardants and can be added to polymeric resins in lower quantities, thereby further ensuring lower costs and also ensuring that some of the inherent properties of the polymeric resin such as ductility, impact resistance, elongation at break, and the like are retained.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An intumescent composition comprising:
   a halogenated polymer;
   antimony oxide; and
   an intercalated graphite.

2. The intumescent composition of claim 1, wherein the halogenated polymer is chlorinated polyethylene.

3. The intumescent composition of claim 2, further comprising a polymeric resin selected from the group consisting of thermoplastic resins, thermosetting resins, and combinations comprising at least one of the foregoing polymeric resins.

4. The intumescent composition of claim 3, wherein the thermoplastic resin is selected from the group consisting of polyolefins, polyamides, polysulfones, polyimides, polyamideimides, polyetherimides, polyether sulfones, polyphenylene sulfides, polyether ketones, polyether ether ketones, polystyrenes, polyacrylates, polyacrylonitrile, polyacetals, polycarbonates, polyphenylene ethers, polyvinylidene chloride, fluoropolymers, and combinations comprising at least one of the foregoing thermoplastic resins.

5. The intumescent composition of claim 3, wherein the thermosetting resin is selected from the group consisting of polyurethane, natural rubber, synthetic rubber, epoxy, phenolic, polyamides, silicones, cyanate esters, vinylcyclobutene, benzocyclobutene, and combinations comprising at least one of the foregoing thermosetting resins.

6. The intumescent composition of claim 1, comprising about 5 wt % to about 90 wt % halogenated polymer, based on the total weight of the intumescent composition.

7. The intumescent composition of claim 6, comprising about 30 wt % to about 75 wt % halogenated polymer.

8. The intumescent composition of claim 7, comprising about 35 wt % to about 70 wt % halogenated polymer.

9. The intumescent composition of claim 1, comprising about 1 wt % to about 60 wt % antimony oxide, based on the total weight of the intumescent composition.

10. The intumescent composition of claim 9, comprising about 3 wt % to about 15 wt % antimony oxide.

11. The intumescent composition of claim 1, further comprising another graphite selected from the group consisting of unexfoliated graphite, flexible graphite, graphitic vapor grown carbon fibers, partially graphitic vapor grown carbon fibers, single wall carbon nanotubes, multi-wall carbon nanotubes and combinations comprising at least one of the foregoing graphites.

12. The intumescent composition of claim 1, comprising about 1 wt % to about 60 wt % intercalated graphite, based on the total weight of the intumescent composition.

13. The intumescent composition of claim 1, further comprising fibrous fillers selected from the group consisting of polyesters, polyarylates, polyethylene, polyvinylalcohol, polytetrafluoroethylene, acrylic resins, aromatic polyamides, polyaramid, polybenzimidazole, polyimide, polyphenylene sulfide, polyether ether ketone, polyimide, polybenzoxazole, aromatic polyimides, polyetherimides, and the like, and combinations comprising at least one of the foregoing fibrous fillers.

14. The intumescent composition of claim 1, further comprising fibrous fillers selected from the group consisting of E-glass, A-glass, C-glass, D-glass, R-glass, S-glass, E-glass derivatives, and combinations comprising at least one of the foregoing fibrous fillers.

15. The intumescent composition of claim 14, comprising about 1 wt % to about 20 wt % fibrous fillers, based on the total weight of the intumescent composition.

16. The intumescent composition of claim 1, further comprising a polyolefin and wherein the halogenated polymer comprises chlorinated polyethylene.

17. The intumescent composition of claim 16, comprising about 5 wt % to about 90 wt % polyolefin and about 5 wt % to about 90 wt % chlorinated polyethylene, based on the total weight of the intumescent composition.

18. The intumescent composition of claim 17, comprising about 1 wt % to about 60 wt % antimony oxide, based on the total weight of the intumescent composition.

19. The intumescent composition of claim 18, comprising about 1 wt % to about 60 wt % intercalated graphite, based on the total weight of the intumescent composition.

20. The intumescent additive mixture of claim 17, wherein the chlorinated polyethylene comprises about 25 wt % to about 45% chlorine, based on the total weight of the chlorinated polyethylene.

21. An intumescent additive mixture consisting essentially of:
   about 35 wt % to about 65 wt % antimony oxide; and
   about 35 wt % to about 65 wt % intercalated graphite.

22. An article made from a reaction product of the intumescent composition of claim 1.

23. The method of making an intumescent composition comprising:
   melt blending a halogenated polymer with antimony oxide and intercalated graphite.

* * * * *